June 23, 1953

R. C. BROOKS 2,642,972

CONTROL SYSTEM FOR FLUID PRESSURE
ACTUATED PROPELLER CLUTCHES
Filed March 11, 1949

INVENTOR.
*Ralph C. Brooks*
BY
*Frank E. Miller*
ATTORNEY

Patented June 23, 1953

2,642,972

UNITED STATES PATENT OFFICE 2,642,972

CONTROL SYSTEM FOR FLUID PRESSURE ACTUATED PROPELLER CLUTCHES

Ralph C. Brooks, Turtle Creek, Pa., assignor to Westinghouse Air Brake Company, a corporation of Pennsylvania Application March 11, 1949, Serial No. 80,832

16 Claims. (Cl. 192—85)

This invention relates to a control system for fluid pressure actuated propellor clutches and more particularly to a clutch control system operative comprising means to automatically disengage the clutch upon stalling of a shaft driven through such clutch.

As is well known, on certain marine engine installations power from the engine is transmitted to the propeller shaft by way of an impositive type of clutch or clutches. Drift floating in the water sometimes enters the propeller and causes stalling of the propeller shaft while the engine governor responds during such stalling to increase the power output from the engine in an effort to maintain a constant speed. With the engine thus developing considerable power and the propeller shaft stalled, the clutch, if allowed to remain engaged, will slip, causing excessive wear and damage due to overheating.

Since stalling of the propeller shaft may occur suddenly and without warning, the operator may not have sufficient time to disengage the clutch before slipping occurs. It is, therefore, a main object of the invention to provide means automatically operative to prevent such slipping of the clutch in event of a stalled shaft. This object is attained by provision of control apparatus operative, upon stalling of the propeller shaft, to automatically effect disengagement of the clutch.

Other objects and advantages will be apparent from the following detailed description of the invention.

In the accompanying drawing; Fig. 1 is a diagrammatic view, partly in outline and partly in section, of clutch control apparatus embodying the invention; and Fig. 2 is a cross-sectional view of a relay valve device, several of which are employed in the control apparatus shown in Fig. 1.

Description

Referring to Fig. 1, for sake of illustration, an internal combustion engine 1, or the like, is shown which is operable to rotate its crank shaft 2 in one direction. Crank shaft 2 is adapted to drive such as a marine propeller shaft 3 in the same or a forward direction as shaft 2 itself rotates through the medium of a forward friction clutch 4, and to drive the propeller shaft 3 in a reverse or direction opposite to that in which shaft 2 itself rotates through the medium of such as reversing gears 5, 6, 7, 8 and 9 and a reverse friction clutch 10. For effecting engagement and disengagement of the friction clutches 4 and 10, respectively, forward and reverse fluid pressure clutch motors 11 and 12, respectively, are provided.

According to the invention, the clutch control apparatus comprises a forward relay valve device 15 for controlling operation of the forward clutch motor 11; a reverse relay valve device 16 for controlling operation of the reverse clutch motor 12; an operator's control valve device 17 for controlling selective operation of the relay valve devices 15 and 16; quick release valve devices 13 and 14 interposed between motors 11, 12 and relay valve devices 15, 16, respectively; a relay valve device 18 arranged to control supply of working fluid under pressure to the relay valve devices 15 and 16; a push button valve device 19, a magnet valve device 20 and a double check valve device 21 arranged to control operation of the relay valve device 18; an electrical speed switch device 22 and interlock means in the form of electrical pressure switches 23, 24 arranged to control operation of the magnet valve device 20; a horn 26 and signal lamps 27, 28, 29 arranged to operate during a certain operation of the clutch control apparatus as will be described hereinafter; and a pressure switch 30 arranged to control a certain type of operation of the horn 26 and lamp 27. Other elements and devices may be introduced hereinafter.

The internal combustion engine 1 may be of any well-known type employed in marine installations, such as a diesel engine adapted to run on fuel controlled by a speed governor (not shown) so as to maintain speed of the engine constant in accord with the governor speed setting during changes in engine load.

The propeller shaft 3 provides for driving a ship propeller (not shown) for propelling a ship in the water. Shaft 3 may be rotated in one direction for propelling the ship ahead, for example, and in its opposite direction for propelling the ship astern.

The forward friction clutch 4 may comprise, for sake of illustration, a friction driving element 35, secured for rotation with the engine crank shaft 2 and a friction, driven element 36 adapted for frictional engagement with the clutch element 35 to act as a driving connection between shafts 2 and 3. Driven element 36 and shaft 3 are shown secured for rotation one with the other by means of a key 37 secured to said shaft and fitting in a groove 38 extending longitudinally in a central bore in element 36 which has a sliding fit with said shaft. Driven element 36 may be slid on shaft 3 toward and away from element 35 for engagement and disengagement therewith.

Of the reversing gears, gear 5 may be secured for rotation with the shaft 2, gear 6 may be secured to a shaft 40 to which a driving element 41 of the reverse clutch 10 is also secured, gear 7 may be secured for rotation with a shaft 42 to which a driven element 43 of said reverse clutch is also so secured by means of a key 44, gear 8 may be secured to a shaft 45 and the gear 9 to the shaft 3. Gears 5 and 6 mesh one with the other so that shaft 40 will rotate in a direction opposite to that in which shaft 2 turns, and with clutch 10 engaged, shaft 42 will rotate with shaft 40. The gear 7 meshes with gear 8, which in turn also meshes with the gear 9 so that with shaft 42 turning in a direction opposite to that in which shaft 2 turns, the shaft 45 will turn in the same direction as shaft 2 and the propeller shaft 3 will turn in a direction opposite to shaft 2 for propelling the ship astern.

The reverse clutch 10 is similar to the forward clutch 4 and is engaged by advancing driven element 43 into contact with driving element 41 and disengaged by moving same away from the driving element.

While the engine is running and shaft 2 turning, with clutch 4 engaged and clutch 10 disengaged, the propeller shaft 3 will be driven in its ahead or forward direction, and conversely, with clutch 4 disengaged and clutch 10 engaged, the propeller shaft will be driven in its astern or reverse direction.

The clutch motor 11 may comprise a hollow cylinder 50 in which is slidably disposed a piston 51, to which is attached a piston rod 52. The piston rod 52 is in turn attached to the driven clutch element 36 through the medium of such as a clutch actuating element 53 for engaging and disengaging the forward friction clutch 4. The actuating element 53 may be slidably guided in a fixed element 54 and provided with a transversely projecting end 54' which fits into an annular groove 55 in clutch element 36, so that with movement of element 53 in one direction, said element 36 is brought into engagement with clutch element 35, and with movement in the opposite direction said clutch element 36 is disengaged from said element 35. Piston 51 is exposed to a pressure chamber 56 to which fluid under pressure may be supplied for urging said piston to move in a direction for causing engagement of clutch 4. At the opposite side of piston 51 there is a chamber 57 open to atmosphere which contains a compression spring 58 arranged to urge piston 51 to move in the direction of pressure chamber 56 for causing disengagement of the clutch 4.

The clutch motor 12 may be like the clutch motor 11 and comprises a piston 60 which is operable in response to supply of fluid under pressure to a pressure chamber 61 to effect engagement of the reverse friction clutch 10 through the medium of a piston rod 62 and actuating element 63. A compression spring 64 in an atmospheric chamber 65 is arranged to move piston 60 in the direction for disengaging clutch 10 upon subsequent venting of fluid under pressure from the chamber 61.

The quick release valve devices 13 and 14 may, for the purpose of illustration, each comprise a casing 70 having a flexible diaphragm 71 disposed therein and arranged in such a fashion that when fluid under pressure is supplied to an inlet opening and chamber 72, such fluid under pressure may flow around the outer peripheral edge of the diaphragm to a delivery opening and chamber 73 while the diaphragm is urged against an annular seat element 74 to hold an exhaust opening 75 closed. When pressure of fluid in the inlet chamber 72 is held equal to that in the delivery chamber 73, the diaphragm 71 will hold the exhaust opening 75 closed. When pressure of fluid in the inlet opening 72 is subsequently reduced below the pressure of fluid in the delivery chamber 73, the outer peripheral edge of the diaphragm 71 is urged into sealing engagement with an inner surface of casing 70 to close the delivery chamber 73 from the inlet chamber 72, while the diaphragm flexes away from the seat element 74 to uncover exhaust opening 75 and allow fluid under pressure from the delivery opening 73 to flow directly to atmosphere by way of said exhaust opening.

In the quick release valve device 13 its delivery opening 73 is connected to a pipe 81 which has a connection with chamber 56 in clutch motor 11.

In the quick release valve device 14, its delivery opening 73 is connected to a pipe 84 which has a connection with the chamber 61 in the clutch motor 12.

The relay valve devices 15, 16 and 18 shown in outline in Fig. 1 may be alike, and, for the following detailed description of each, reference may be made to the valve device shown substantially in cross section in Fig. 2. Each of the devices 15, 16 and 18 may comprise a casing 100 having a diaphragm 101 disposed therein and subject on its one side to pressure of fluid in a diaphragm control chamber 102 and on its opposite side to atmospheric pressure in a chamber 103. Also formed in the casing are chambers 104, 105 and 106, chamber 104 being separated from chamber 103 by a partition 107 and from the chamber 105 by a partition 108. A partition 109 separates chamber 105 from the chamber 106. A valve 110 is disposed in chamber 104 for controlling communication between the chamber 105 and said chamber 104. The valve 110 may be secured to a fluted stem 111 slidably mounted in a suitable bore extending through the partition 108, a valve seat being formed at the end of the bore opening into chamber 104 to accommodate the valve 110. A valve 112, similar to valve 110, is disposed in the chamber 106 for controlling communication between the chamber 105 and said chamber 106. The valve 112 is attached to a fluted stem 113 which is slidably disposed in a suitable bore extending through the partition 109, a valve seat being formed in the end of said bore opening into the chamber 106 to accommodate the valve 112. Both of the fluted stems 111 and 113 project into and meet in the chamber 105. A bias spring 114 is disposed in the chamber 106 and arranged to urge the valve 112 towards its seat, and at the same time through engagement of stems 111 and 113, to urge the valve 110 away from its seat. The valve 110 is operably connected to the diaphragm 101 by means of a rod or stem 115 extending through a bore in a partition 107. A control spring 116 is provided in chamber 103 to oppose deflection of the diaphragm 101 in the direction of chamber 103.

In operation of each of the relay valve devices 15, 16 and 18, upon supply of fluid under pressure to the control chamber 102, the diaphragm 101 will deflect in the direction of chamber 103 against opposition of the springs 116 and 114 and cause seating of the valve 110 and unseating of the valve 112. With the valve 110 closed and the valve 112 open, chamber 105 will be closed to the chamber 104 and open to the chamber 106. Upon subsequent venting of fluid under pressure from the control chamber 102, the bias spring 114 and the control spring 116 will return the diaphragm 101 and valves 110 and 112 to the positions in which they are shown in the drawing, the valve 112 being seated and the valve 110 being unseated. With valve 110 unseated and the valve 112 seated, the chamber 105 will be closed to the chamber 106 and open to the chamber 104.

Hereinafter, in describing operation of any of the relay valve devices 15, 16 and 18 in the apparatus, when the valve 110 is unseated and the valve 112 seated, the communication between chambers 104 and 105 thus established will be referred to as a communication 118 which is indicated in Fig. 1 by a solid line bearing the reference numeral 118. Similarly, when the valve 110 is seated and the valve 112 unseated, the communication thus established between chambers 105 and 106 will be referred to as a communication 119 which is indicated symbolically by a dash line in Fig. 1 bearing the reference numeral 119.

In the forward relay valve device 15, its chamber 105 is connected to the inlet opening 72 in the quick release valve device 13 by way of a pipe 125, and its chamber 103 is connected to atmosphere by way of such as a pipe 126'.

In the reverse relay valve device 16, its chamber 105 is connected to the inlet opening 72 in the quick release valve device 14 by way of a pipe 126, and its chamber 104 is connected to atmosphere by way of such as a pipe 127.

The operator's control device 17 may be substantially similar to the control device described in United States Patent No. 2,329,742, issued September 21, 1943, to R. J. Bush et al. and assigned to the assignee of the present application. For a detailed description of the device 17, reference may be made to the aforementioned patent.

For sake of brevity, the control device 17 will operate upon movement of a handle 130 to a "Neutral" position, to vent two control pipes 131 and 132 to atmosphere, upon movement of handle 130 to a "Forward" position to connect the control pipe 131 to a fluid pressure supply pipe 133 while maintaining pipe 132 vented, and upon movement of handle 130 to a "Reverse" position to connect the control pipe 132 to the supply pipe 133 while venting the pipe 131. The positions of handle 130 are indicated in the drawing by dot and dash lines bearing the proper titles. The control pipes 131 and 132 are connected to the control chambers 102 in the relay valve devices 15 and 16, respectively. The supply pipe 133 is connected to a source of fluid under pressure such as a fluid pressure reservoir 140.

In the relay valve device 18, its chamber 106 is connected to the fluid pressure supply pipe 133, its chamber 104 is connected to atmosphere by way of such as a pipe 142, and its chamber 105 is connected to the chambers 106 in the relay valve devices 15 and 16 by way of a fluid pressure supply pipe 143 and respective chokes 144 and 145.

The push button valve device 19 may, for sake of illustration, comprise a supply valve 281 for controlling a communication between a supply chamber 282 and a delivery chamber 283, and a release valve 284 for controlling another communication between said delivery chamber and an exhaust chamber 285. The valves 281 and 284 may be disposed in the chambers 282 and 285, respectively, and may be attached to fluted stems 286 and 287, respectively, which extend through respective bores in the casing of the device and project into and meet in the chamber 283. A compression spring 288, disposed in the chamber 282, is arranged to urge the valve 281 toward a seated position for closing off the delivery chamber 283 from the supply chamber 282, and through engagement of the stems 286 and 287 to at the same time urge the valve 284 toward an unseated position for opening the delivery chamber to the exhaust chamber 285. A stem 289 is attached to the valve 287 to act as a medium through which same may be actuated to a closed position and the valve 281 to an open position, against opposition of the spring 288. The stem 289 extends through the chamber 285 and outwardly through the casing, being provided at its outer projecting end with a push button 290 through which said stem may be actuated manually.

In the device 19, the supply chamber 282 is connected to the fluid pressure supply pipe 133, the exhaust chamber 285 is connected to atmosphere by way of such as a port 291, and the delivery chamber 283 is connected to one inlet of the double check valve device 21 by way of a pipe 292. Normally, the valves 281 and 284 assume the positions in which they are shown in the drawing, that is, seated and unseated, respectively, so that the pipe 292 will be open to atmosphere via the unseated valve 284.

The magnet valve device 20 may be of any well-known structure and for sake of illustration may comprise a casing 300 having a supply chamber 301, a delivery chamber 302 and an exhaust chamber 303 formed therein. The delivery chamber 302 is separated from the supply chamber 301 by a partition 304 and from the exhaust chamber 303 by a partition 305. A supply valve 306 is disposed in the delivery chamber 302 and arranged for cooperation with a supply valve seat formed at one end of a bore extending through the partition 304, and an exhaust valve 307 also is disposed in chamber 302 and arranged for cooperation with an exhaust valve seat formed at one end of a bore extending through the partition 305. The supply valve 306 is attached to one end of a fluted stem 308 which is slidably disposed in the bore extending through the partition 304. The opposite end of the stem 308 extends into the supply chamber 301 and is adapted by means of an attached spring seat member to accommodate one end of a compression spring 309 disposed in said supply chamber. The spring 309 is arranged to urge the supply valve 306 away from its seat in partition 304 and at the same time to urge the exhaust valve 307 toward its seat in the partition 305. The exhaust valve 307 is attached to a fluted stem 310 slidably guided in the bore in partition 305. When supply valve 306 is unseated or "open," the delivery chamber 302 is open to the supply chamber 301 and when said supply valve is seated or "closed," the delivery chamber is closed to the supply chamber. When the exhaust valve 307 is seated or "closed," the delivery chamber 302 is closed from the exhaust chamber 303 and when the exhaust valve is unseated or "open," the delivery chamber is open to the exhaust chamber. The fluted stem 310 extends into and through the exhaust chamber 303 to a magnet portion 311 of the valve device. The magnet portion 311, may comprise a magnet (not shown) operatively connected to the stem 310 and so adapted and arranged as to simultaneously open the exhaust valve 307 and close the supply valve 306 when energized, against opposition of spring 309 which will open the supply valve and close the exhaust valve when the magnet is deenergized.

In the magnet valve device 20, opposite poles of the magnet in portion 311 are connected to terminals 313 and 314 adapted to be connected by electric wires or lines, as will be described, to control energization of said magnet, the exhaust chamber 303 is constantly open to atmosphere by way of a port 315 in the casing, the supply chamber 301 is connected to a branch of the pipe 143, and the delivery chamber 302 is connected by way of a pipe 316 to another inlet to the double check valve device 21, as will be described subsequently.

The double check valve device 21 may be of a well-known structure and in the usual form simply comprises a casing having a piston valve 317 slidably mounted therein to control communication between one or the other of two opposite alike inlet openings 318 and an outlet opening 319. The inlet openings 318 are connected to pipes 292 and 316, respectively, and the outlet opening is connected to the control chamber 102 in the relay valve device 18 by way of a pipe 320.

In operation, the double check valve device 21 will operate to permit charging of the pipe 320 with fluid under pressure should either or both of the pipes 292 or 316 be so charged and to permit venting of the pipe 320 to atmosphere only when both of the pipes 292 and 316 are so vented by way, respectively, of the push button valve device 19 and magnet valve device 20.

The speed switch device 22, schematically, may comprise a rotary element 400 arranged to be turned by the propeller shaft 3 through such as gears 401 and 402. Secured for rotation with the rotary element 400 are fly-ball elements 404 which are operatively connected to an electrical switch element 405 which is adapted and arranged to assume a closed position to connect a contact 406 electrically to a contact 407. A tension spring 408 is arranged to cooperate with the fly-ball elements 404 to urge the switch 405 toward or to its closed position in which it is shown in the drawing.

In operation of the speed switch device 22, when the propeller shaft 3 is turning in either direction at a speed above some certain value, such as twenty-five revolutions per minute, the centrifugal force of the rotating fly-ball elements 404 will be sufficiently great to overcome action of the spring 408 and open the switch 405. With switch 405 open the contacts 406 and 407 are isolated electrically one from the other. When the rotational speed of the propeller shaft 3 drops below the above-mentioned certain speed, the spring 408 will again close the switch 405, establishing an electrical connection between contacts 406 and 407.

The pressure switches 23, 24 acting as interlock means in the control connection between magnet valve device 20 and the speed switch device 22 and the pressure switch 30 may be substantially alike and for this reason identical parts will bear like reference numerals. Each of the pressure switch devices 23, 24 and 30 may comprise a casing 499 having a piston 500 slidably disposed therein. At one side of piston 500 is a pressure chamber 501 while at the opposite side is a non-pressure chamber 502 open to atmosphere by way of a port 503. A compression spring 505 is disposed in the chamber 502 arranged to urge the piston 500 in the direction of chamber 501 toward and to a rest position seated on a shoulder 506, in which position it is shown in the drawing. Attached to the piston 500 for movement therewith is a piston rod 510 which extends through chamber 502 and one end of the casing 499. At its outer projecting end, the rod 510 is provided with a switch element 511 which is isolated electrically from the rod itself.

In regard to the pressure switch 23, its chamber 501 is connected to a branch of the pipe 81 by way of a choke and check valve device 515 and a pipe 516. When chamber 501 is void of fluid under pressure, the piston 500 will be in its rest position seated on shoulder 506 and the switch element 511 will be disposed away from two spaced apart electrical contact elements 517 and 518. When fluid is supplied to chamber 501 at a pressure sufficient to cause a certain compression of spring 505, through movement of piston 500, the contact element 511 will be brought into engagement with the contact elements 517 and 518 which thereby will be connected electrically. When fluid under pressure subsequently is vented from chamber 501, spring 505 will return piston 500 to its rest position in which switch element 511 is again disposed away from contact elements 517 and 518.

The pressure switch 24 similarly is provided with two spaced apart electrical contact elements 519 and 520 which are arranged to be connected electrically by engagement of the respective switch element 511 when fluid under pressure is supplied to the respective chamber 501 and to become disconnected when said switch element leaves the elements with movement of the respective piston 500 to its rest position. The chamber 501 in pressure switch 24 is connected to a branch of the pipe 84 by way of a choke and check valve device 525 and a pipe 526.

In description of operation hereinafter, the pressure switches 23 and 24 will be referred to as assuming a closed position in response to supply of fluid under pressure to their respective chambers 501, with switch elements 511 engaging respective contact elements 517, 518 and 519, 520. When fluid under pressure is vented from the respective chambers 501, the pressure switches 23 and 24 hereinafter will be referred to as assuming an open position in which each is shown in the drawing with the respective switch element 511 disposed away from the respective contacts 517, 518 and 519, 520.

In the pressure switch 30, its chamber 501 is connected to a branch of the pipe 143, and its switch element 511 is arranged to establish connection between two spaced apart electrical contacts 530 and 531, when its chamber 501 is vented, and to disestablish such connection when fluid under pressure is supplied to said chamber. With connection established between contacts 530 and 531, the switch 30 hereinafter will be referred to as being closed, and with such connection disestablished, the switch 30 will be referred to as being open.

The wiring of the electrical portion of the apparatus is as follows:

One contact of each of the pressure switches 23, 24 and 30, such as contacts 517, 519 and 531 are connected to one terminal, such as the positive terminal, of a source of electrical energy such as a battery 535 by means of a wire 536. The opposite contacts 518 and 520 of switches 23 and 24 and one contact 407 of the speed switch device 22 are connected to the opposite pole of the battery 535 by way of a wire 538, the filament of the signal lamp 29 and wire 539 which latter wire is also connected to one terminal, such as terminal 314, of the magnet valve device 20, to the opposite contact 406 of speed switch device 22 and to the opposite terminal 313 of the magnet valve device by way of the filament in the signal lamp 28 and a wire 541. Wire 539, hence the negative terminal of battery 535, may also be connected to the contact 530 of pressure switch 30 by way of the windings in the horn 26, a wire 545, a manual switch 546, when in a "Continuous operation" position, and a wire 547, which wire 547 is constantly connected to the wire 539 by way of the filament in the lamp 27. With the manual switch in another or "Automatic cut-off" position, indicated by a dot-and-dash line so titled in the drawing, the wire 545 is disconnected from the wire 547 and connected instead to the wire 541.

The choke and check valve devices 515 and 525 may simply comprise a choke 600 and a check valve 601 arranged in parallel in a passage 603 in such a manner that flow of fluid under pressure from an inlet 604 of said passage to an outlet 605 must occur by way of said choke, while flow of fluid under pressure in the reverse direction, that is from outlet to inlet, may occur by way of the check valve as well.

The inlet 604 of device 515 is connected to a branch of the pipe 81 and the outlet 605 of said device is connected to the pipe 516. The corresponding inlet of device 525 is connected to a branch of the pipe 84 and the corresponding outlet of said device is connected to the pipe 526.

*Operation of the clutch control apparatus*

In operation, let it be assumed initially that the reservoir 140 is charged with fluid under pressure from such as a compressor (not shown), that the operator's control device 17 in the pilot house is in its "Neutral" position and that the propeller shaft 3 is stopped at this time, but free to turn in a normal manner.

With the operator's control device 17 in its "Neutral" position, both control pipes 131 and 132 will be vented to atmosphere so that the relay valve devices 15 and 16 will be conditioned to establish their communication 118 venting pipes 125 and 126 to atmosphere by way of pipes 126' and 127, respectively. With the pipes 125 and 126 thus vented, it will be seen that the clutch motors 11 and 12 will be so positioned, with their chambers 56 and 61, respectively, vented, that both the forward and reverse clutches will be disengaged so that there will be no driving connection at this time between the engine crank shaft 2 and the propeller shaft 3. At the same time, with pipes 125 and 126 both vented, the pressure switches 23 and 24 both will be open so that there will be no electrical connection between the wires 536 and 538 at this time.

At the same time, with the shaft 3 stopped, the speed switch 22 will be closed so that at this time the wire 538 will be connected to the wire 541.

Assume still further that the operator holds the push button 230 of valve device 19 depressed to unseat valve 281 and thereby effect supply of fluid under pressure from pipe 133, by way of pipe 292, double check valve 21, and pipe 320 to the control chamber 102 in relay valve device 18 to cause establishment of its communication 119. The pipe 143 will be pressurized, being connected to supply pipe 133 by way of the communication 119 in the relay valve device 18, so that the pressure switch 30 will be open.

With pressure switches 24 and 30 open, it will be seen that electrical energy from the battery 535 is prevented from flowing by way of wire 536 to either the wire 538 or to the wire 547. Since electrical energy is not being supplied to the wire 538 at this time, same will not be supplied to the magnet valve device 20 via wire 541, nor to the lamp 28, nor to the lamp 29, nor to the lamp 27 via wire 547, nor to the horn 26 via wire 547 and the switch 546 in its "Automatic cut-off" position. Under the assumed conditions, therefore, the magnet valve device 20 will be deenergized and conditioned to connect the charged pipe 143 to the pipe 316, the lamps 28, 29 and 27 will be out and the horn 26 will be silent. With pipe 316 pressurized from pipe 143, the pipe 320 and hence the control chamber 102 in the relay valve device 18 will also be so pressurized by way of the double check valve device 21, so that said relay valve device 18 is conditioned to maintain its communication 119 established.

Assume now that the engine is running with the crank shaft 2 therefore turning over and that the operator in the pilot house desires to engage the forward clutch 4 to effect propelling of the ship forward. The operator will then move the handle 130 of the operator's control device 17 in the pilot house to "Forward" position, thereby causing the control pipe 131 to be charged with fluid under pressure from the supply pipe 133 while the pipe 132 remains vented to atmosphere.

With pipe 131 charged, the relay valve device 15 will respond to establish its communication 119 connecting the now charged pipe 143 to the pipe 125, so that the chamber 56 in the forward clutch motor 11 will become charged with fluid under pressure by way of the quick-release valve device 13 and the pipe 81. The motor 11 then responds to effect engagement of the forward clutch 4 to drive the propeller shaft 3 for propelling the ship forward. When the speed of the propeller shaft 3 thus driven through the forward clutch attains a speed greater than twenty-five revolutions per minute, for example, the speed switch 22 will open and disconnect the wire 541 from the wire 538.

At the same time that the above is occurring, fluid under pressure from the pipe 81 will flow by way of the choke 600 in the choke and check valve device 525 to the chamber 501 in the pressure switch 23. When pressure of fluid thus supplied to switch 23 becomes sufficiently great, said switch will close, connecting wire 536 from the battery to the wire 538 to the speed switch. During normal running operation of the ship, with the propeller shaft 3 free to rotate, the choke 600 so delays closing of the switch 23 as to allow said shaft to come up to speed and the speed switch device 22 to open before switch 23 closes, for reasons which will become obvious hereinafter.

With the speed switch device 22 open, no electrical energy can flow to the magnet valve device 20, since wire 541 is cut off from the source of such energy by the open switch device 22, and said magnet valve device 20 remains positioned as before connecting the pipe 316 to the charged pipe 143 for holding the relay valve device 18 in position to maintain its communication 119 established connecting said pipe 143 to the supply pipe 133.

With closing of the pressure switch 23, electrical energy from the battery 535 will flow by way of wire 536, said switch and wire 538 through the lamp 29 and wire 539 back to said battery to cause said lamp to light. The lamp 29 may be of green color and located on the control stand in the pilot house of the boat to indicate to the operator that the source of electrical energy, such as the battery 535, is charged, for example, and that energy is available for the proper functioning of the protection system.

Since the switch 30 will remain open, with pipe 143 remaining charged, during normal operation of the clutches, the warning lamp 27 and the horn 26 in the pilot house will remain inoperative, that is, the lamp will remain off and the horn will remain silent.

Thus it will be seen that the operator in the pilot house may engage the forward clutch for propelling the ship in the forward direction without interference from the protective portion of the apparatus while the propeller shaft 3 is free to rotate in a normal manner.

Now assume that the operator in the pilot house desires to disengage the forward clutch 4 to terminate the driving connection between the engine and the propeller shaft 3. He will simply move the handle 130 of the operator's control device 17 from its "Forward" position to its "Neutral" position, thereby causing venting of the previously charged control pipe 131 to atmosphere along with the control pipe 132 which remains so vented.

Upon venting of the pipe 131, the relay valve device 15 will respond to disestablish its communication 119 and establish its communication 118, thereby disconnecting the pipe 125 from the charged pipe 143 and connecting said pipe 125 to atmosphere by way of the pipe 126.

With the pipe 125 thus connected to atmosphere, the pipe 81 will vent rapidly to atmosphere by way of the quick release valve device 13, allowing the spring 58 in the clutch motor 11 to disengage the forward clutch 4, thereby allowing the propeller shaft 3 to coast to a stop or to a substantial stop, with the speed switch device 22 assuming its closed position when speed of the shaft drops below twenty-five revolutions per minute, as the chosen example.

At the same time, immediately upon venting of the pipe 125 to call for release of the forward clutch 4, fluid under pressure in the chamber 501 in the pressure switch 23 will release rapidly to atmosphere by way of the pipe 516, check valve 601, and the pipe 81, so that said switch will open before the speed switch device 22 closes.

With the forward clutch 4 disengaged and the propeller shaft 3 stopped, but free to turn in a normal manner, the parts of the apparatus will assume the respective positions as aforedescribed.

Now assume that the operator desires to engage the reverse clutch 10 for effecting propulsion of the ship in the astern direction, and that the propeller shaft 3 is yet free to turn in a normal manner. The operator will then move the handle 130 of the operator's control device 17 in the pilot house from its "Neutral" position to its "Reverse" position, thus causing the pipe 132 to be supplied with fluid under pressure from the supply pipe 133 while the pipe 131 remains vented to atmosphere.

With the pipe 132 thus supplied with fluid under pressure the relay valve device 16 will respond to disestablish its communication 118 which connects pipe 126 to atmosphere and to establish its communication 119, connecting said pipe 126 to the pressurized pipe 143. Fluid under pressure will then flow via pipe 126, quick release valve device 14 and pipe 84 to the chamber 61 in the reverse clutch motor 12 and at a slower rate via the choke 600 in device 525 and pipe 526 to the chamber 501 in the pressure switch 24.

Fluid under pressure supplied to chamber 61 in clutch motor 12 will cause engagement of the reverse clutch 10, whereupon the propeller shaft 3 will be driven by engine shaft 2 in a direction for propelling the ship astern, as will be appreciated from the previous description. When the propeller shaft 3 thus driven by the engine shaft turns over at a speed above twenty-five revolutions per minute, which speed as chosen for example is less than any normal speed of said shaft either when propelling the ship even under idling or slow speed conditions, the speed switch device 22 will again open, disconnecting wire 541 from the wire 538.

At the same time, pressure of fluid is built up in the chamber 501 of the pressure switch 24, and shortly after the speed switch 22 opens, with the propeller shaft 3 coming up to speed in a normal manner, such pressure will attain a degree sufficient to cause said switch 24 to close, connecting the wire 536 from the battery to the wire 538 to the open speed switch device 22. Again, electrical energy from battery 535 will flow via the wire 536, switch 24, and wire 538 through the lamp 29 in the pilot house for example to indicate to the operator that such battery is charged and in working order for operating the electrical portion of the apparatus.

As before, when the forward clutch was engaged and the propeller shaft was being driven in a normal manner, now with such propeller shaft again being driven in a normal manner in its reverse direction through the reverse clutch, the open speed switch device 22 interrupts what would otherwise be an electrical circuit by way of wire 536, switch 24, wire 538 and wire 541, through the lamp 28 and the magnet valve device 20 back to the battery via wire 539, so that the lamp 28 remains off and the magnet valve device remains deenergized.

With the magnet valve device 20 deenergized, the pipe 316, hence pipe 320, remain connected to the charged pipe 143 while the relay valve device 18 remains conditioned by virtue of the pressurized pipe 320 to maintain connection between said pipe 143 and the supply pipe 133.

With pipe 143 charged with fluid under pressure, the pressure switch 30 remains open and interrupts what would otherwise be an electrical circuit from the battery by way of wire 536, wire 547, the lamp 27, the switch 546 in its "Continuous Operation" position, and the horn 26 and wire 539 back to the battery so that the warning lamp 27 in the pilot house remains off and the horn, also in the pilot house, remains silent.

Thus it will be seen that the clutch control apparatus may be operated to effect engagement of the reverse clutch 10 without interference from the protective portion of said apparatus while the propeller shaft 3 remains free to operate in a normal manner.

The reverse clutch 10 may now be caused to disengage by movement of the handle 130 of the operator's control device 17 to its "Neutral" position, whereupon both control pipes 131 and 132 again become vented to atmosphere, and fluid under pressure will release from the clutch motor 12 and pressure switch 24 by way of the pipe 84 and quick release valve device 14 upon venting of pipe 126 by way of the relay valve device 16, which device will assume the proper position in response to venting of pipe 132. The pressure switch 24 then opens to prevent establishment of an electrical circuit through the magnet valve device 20 and the lamp 28 when the speed switch device 22 again closes as the propeller shaft 3 again slows down as a consequence of disengagement of the reverse clutch 10 by the spring 64 in clutch motor 12. It will be seen that the pipe 143 will remain charged, since the magnet valve device 20 remains deenergized and causes the position of relay valve device 18 to be maintained. The pressure switch 30 therefore will remain open, with pipe 143 charged, and the warning light 27 in the pilot house will remain off and horn 26 will remain silent.

If, while either of the clutches 4 or 10 is engaged for causing propulsion of the ship in its forward direction or its astern direction, it is desired to effect a snap reversal that is, from forward to astern or from astern to forward, whichever the case might be, the operator may move the handle 130 of the operator's control device 17 directly from its "Forward" or "Reverse" position through "Neutral" to its opposite "Reverse" or "Forward" position. In so doing, the status of the control pipes 131 and 132 becomes reversed, whichever one was charged at the time will become vented and whichever one was vented at the time will become charged. The status of the relay valve devices 15 and 16 will also become reversed, and one will assume position to cause venting of the previously pressurized clutch motor 11 or 12 by way of the respective quick release valve device 12 or 14, while the other will assume position to effect supply of fluid under pressure to the other clutch motor. Since it is imperative that both clutches 4 and 10 be not engaged at the same time while the engine is running, the chokes 144 and 145 serve to delay build-up of pressure in the respective clutch motor during engagement while release of fluid under pressure from either of the clutch motors is effected rapidly by way of the quick release valve devices 13, 14 for causing disengagement of clutches. Chokes 144 and 145 also serve during engagement of a clutch to "soften" such engagement.

During such a snap reversal, the status of pipes 125 and 126, and hence pipes 81 and 84, change with the change in status of the relay valve devices 15 and 16, so that one of the pressure switches 23 and 24 will close and the other will open. Due to the choke and check valve devices 515 and 525, the pressure switch which is opening will open sooner than the other pressure switch will close, so that both will remain open a sufficient time for the speed switch device 22 to close and re-open as shaft 3 stops rotation in one direction and comes up to speed in its new direction.

It will be seen therefore, that a snap reversal in direction of rotation of the propeller shaft 3 may be effected without interference from the protective portion of the clutch control apparatus. During such reversal, assuming that the shaft 3 remains free to turn, both of the pressure switches 23 and 24 remain open during the time that the speed switch device 22 is closed, so that the electrical circuit through the magnet valve device 20 and lamp 28 remains open. The magnet valve device 20 remains deenergized, as before, and the lamp 28 remains off. It will be seen that pipe 143 remains charged and connected to the supply pipe 133 via the relay valve device 18, the pressure switch 30 therefore remains open and the warning lamp 27 and horn 26 remain inactive.

Now assume that the propeller shaft 3 is being driven through one or the other of the friction clutches 4, 10 in a normal manner. Under such condition, the respective positions of the control apparatus will be as aforedescribed, or briefly, the speed switch device 22 will be open, one of the pressure switches 23, 24 will be closed, the magnet valve device 20 will be deenergized, the pipe 143 will be charged, pressure switch 30 will be open, and warning lamp 28 and horn 26 will be inactive.

Now assume further, that while the propeller shaft 3 is thus turning to propel the ship either forward or astern, that drift or debris floating in the water in which the ship is being propelled joins the propeller and stalls the propeller shaft 3. As soon as the speed of the propeller shaft 3 drops below the presumed twenty-five revolutions per minute, which may occur substantially instantly depending on the predicament of the propeller, the speed switch device 22 will close. At the time that the speed switch device 22 thus closes, electrical energy from the battery 535 will flow by way of the wire 536, the closed pressure switch 23 or 24, wire 538, speed switch device 22, wire 541, through the magnet valve device 20, and the wire 359 back to the battery. The magnet valve device 20 therefore will become energized and operate to disconnect the pipe 316 from the pipe 143 and connect said pipe 316 to atmosphere via port 315. Since the pipe 292 is vented to atmosphere via the push button valve device 19 at the time that pipe 292 is thus vented to atmosphere, fluid under pressure will release from the control chamber 102 in the relay valve device 18 by way of pipe 320 and the double check valve device 21. When fluid under pressure is thus released from its control chamber, the relay valve device 18 will respond to disconnect the pipe 143 from the supply pipe 133 and to connect said pipe 143 to atmosphere by way of its communication 118 and the pipe 142.

With pipe 143 vented to atmosphere, the relatively small volume of fluid under pressure in the inlet chamber 72 of the quick-release valve device 13 or 14 will release rapidly through the pipe 125 or 126, the communication 119 in the respective relay valve device 15 or 16, the choke 144 or 145, and the pipe 143 to allow a quick release of the larger volume of fluid under pressure from the chamber 56 or 61 in the clutch motor 11 or 12 by way of the pipe 81 or 84 and the exhaust opening 75 in the quick release valve device 13 or 14. Upon release of fluid under pressure from the chamber 56 or 61 in the clutch motor 11 or 12, the previously engaged clutch 4 or 10 will be disengaged by the spring 58 or 64, thereby terminating the driving connection between the engine shaft 2 and the stalled propeller shaft 3, which, according to the main feature of the invention, prevents the engine from attempting to drive the stuck or stalled propeller shaft through the friction clutch which might be damaged by such attempt, through slipping or excess strain.

At the same time that magnet valve device 20 is energized as above described by supply of electrical energy from the battery by way of wire 536, one or the other of the pressure switches 23, 24, the wire 538, the speed switch device 22, and the wire 541, electrical energy will also flow from the wire 541 back to the battery by way of the lamp 28 and wire 539. The lamp 28 may be located in the engine room on the ship to serve as a visible warning signal that a shaft stall has occurred.

When, as described above, the pipe 143 is vented via the relay valve device 18 upon energization of the magnet valve device 20, to cause release of the engaged friction clutch 4 or 10 when the propeller shaft 3 stalls, the pressure switch 30 will close. When switch 30 closes, electrical energy from the battery 535 will flow by way of the wire 536 and said switch, to wire 547. From wire 547, such energy will flow via the signal lamp 27 in the pilot house and also assuming manual switch 546 to be in its "Continuous operation" position, by way of said switch, wire 545, and horn 26, back to the battery via wire 539. With electrical energy thus supplied thereto, the lamp 27 will light and horn 26 will blow to act as a visible and audible indication to the operator in the pilot house that a propeller shaft stall has occurred and that the protective system is in operation to effect disengagement of the engine from such shaft.

When the pipe 81 or 84 is vented to atmosphere to effect release of the clutch 4 or 10 as above described, fluid under pressure will release from the chamber 501 in the previously closed pressure switch 23 or 24 by way of pipe 516 or 526, choke and check valve device 515 or 525 and said pipe 81 or 84. The pressure switch 23 or 24 thus will open substantially at the time that the clutch 4 or 10 is disengaged, and in opening will break the electrical circuit from the battery 535 through the lamp 28 and the magnet valve device 20, so that said lamp 28 will be extinguished and said magnet valve device will be denergized.

With magnet valve device 20 deenergized, it will respond to again connect the pipe 316 to the pipe 143 which is now vented to atmosphere, so that said pipe 316 will remain so vented at this time. The pipe 320 will also remain vented via double check valve device 21, and the relay valve device 18 will maintain the pipe 143 vented via pipe 142. It will be seen, therefore, that the operator in the pilot house may not now engage either clutch by manipulation of the control handle 130 of device 17, since the relay valve devices 15, 16 have no source of fluid pressure supply now connected to them.

Since the pressure switch 30 remains closed when pressure switch 23 or 24 opens as above, the signal lamp 27 in the pilot house will remain on as will the horn 26 so long as manual switch 546 remains in its "Continuous operation" position. If, however, at this time the operator in the pilot house desires to terminate sounding of the horn 26, he may move switch 546 to its "Automatic cut-off" position, thereby disconnecting the wire 545 from the wire 547 and connecting same to the wire 541 which is disconnected from the battery at this time by the open pressure switches 23, 24.

If the manual switch 546 is already in its "Automatic cut-off" position at the time that the magnet valve device 20 is energized to call for automatic disengagement of clutch 4 or 10 when shaft 3 is stalled as above described, it will be seen that the horn 26 will blow with energization of said device 20 to let the operator know of such disengagement, and when the pressure switch 23 or 24 opens to deenergize said magnet valve device, electrical energy to the horn is simultaneously cut off to silence same automatically.

It will thus be seen that during propulsion of the ship, in event of a stalled propeller shaft due to jamming of the propeller, for example, the clutch control apparatus functions to automatically effect disengagement of the clutch connecting the engine and propeller shaft and to effect visible and audible signals to indicate existence of such stalled shaft condition. At the same time, the control apparatus functions to prevent effecting reengagement of the automatically disengaged clutch from the pilot house until certain conditions are reestablished, which conditions will be described subsequently.

Now assume that the propeller shaft 3 is freed and it is desired to render the clutches 4 and 10 again controllable from the pilot house by operation of the control valve device 17. The engineer in the engine room of the ship will then press the button 290 of the push button valve device 19 to cause said device to effect supply of fluid under pressure from the supply pipe 133 to the pipe 292, and by way of the double check valve device 21 and pipe 320, hence to the control chamber 102 in the relay valve device 18. The device 18 will then respond to pressurization of its control chamber to disestablish its communication 118 and to establish its communication 119 again connecting the pipe 143 to the supply pipe 133. Fluid under pressure from pipe 133 will flow into and through the pipe 143, the deenergized magnet valve device 20, into pipe 316 to the opposite inlet of the double check valve device 21. When the engineer releases the button 290, the valve device 19 will again vent the pipe 292 to atmosphere, while the pressure of fluid in the now pressurized pipe 316 will act to maintain the control chamber in relay valve device 18 pressurized. The relay valve device 18 will then maintain its communication 119 established connecting the pipe 143 to supply pipe 133, whereby the control apparatus again will be conditioned for normal operation of the clutches 4 and 10 as described hereinbefore.

*Summary*

It will now be seen that I have provided clutch control apparatus particularly adapted for use on a marine vessel for controlling engagement and disengagement of a clutch or clutches operatively connecting an engine with a propeller shaft. According to a feature of the invention, the clutch control apparatus comprises means which will operate automatically in event of a stalled propeller shaft to effect disengagement of the clutch to free the engine from said stalled propeller shaft and at the same time effect visible and audible indication in pilot house and engine room of such shaft condition. The control apparatus is further provided with protection means which will operate to render the clutch control means in the pilot house ineffective to engage a clutch after such automatic disengagement until such protection means are reset from the engine room.

Having now described my invention what I claim as new and desire to secure by Letters Patent, is:

1. The combination with a power output shaft and a clutch engageable to establish a driving connection between a power input shaft and said power output shaft and disengageable to disestablish said driving connection, of manually operable control means for effecting normal engagement and disengagement of said clutch with said power output shaft free to turn, speed responsive protective means operable when rotation of said power output shaft is caused to drop below a certain speed to effect disengagement of said clutch, drive means connecting said speed responsive means to said power output shaft for operation thereby, and other means operable to render said protective means inoperable for a certain time period subsequent to engagement of said clutch to allow said power output shaft to attain a speed above said certain speed when normally free to turn.

2. The combination with a power output shaft and a clutch engageable to establish a driving connection between a power input shaft and said power output shaft and disengageable to disestablish said driving connection, of manually operable control means for effecting normal engagement and disengagement of said clutch with said power output shaft free to turn, speed responsive protective means operable when rotation of said power output shaft is caused to drop below a certain speed to effect disengagement of said clutch, drive means connecting said speed responsive means to said power output shaft for operation thereby, and other means operable to render said protective means inoperable for a certain time period subsequent to engagement of said clutch to allow said power output shaft to attain a speed above said certain speed when normally free to turn, and operable to render said protective means inoperable when disengagement of said clutch is effected by operation of said manually operable control means.

3. The combination with a power output shaft and a clutch engageable to establish a driving connection between a power input shaft and said power output shaft and disengageable to disestablish said driving connection, of manually operable control means for effecting normal engagement and disengagement of said clutch with said power output shaft free to turn, speed responsive protective means operable when rotation of said power output shaft is caused to drop below a certain speed to effect disengagement of said clutch, and to render said manually operable control means ineffective to control said clutch, drive means connecting said speed responsive means to said output shaft for operation thereby, and other means operable to render said protective means inoperable for a certain time period subsequent to engagement of said clutch to allow said power output shaft to attain a speed above said certain speed when normally free to turn.

4. The combination with a power output shaft and a clutch engageable to establish a driving connection between a power input shaft and said power output shaft and disengageable to disestablish said driving connection, of manually operable control means for effecting normal engagement and disengagement of said clutch with said power output shaft free to turn, speed responsive protective means operable when rotation of said power output shaft is caused to drop below a certain speed to effect disengagement of said clutch, and to render said manually operable control means ineffective to control said clutch, drive means connecting said speed responsive means to said output shaft for operation thereby, and other means operable to render said protective means inoperable for a certain time period subsequent to engagement of said clutch to allow said power output shaft to attain a speed above said certain speed when normally free to turn and operable to render said protective means inoperable when disengagement of said clutch is effected by operation of said manually operable control means.

5. The combination with a power output shaft and a clutch engageable to establish a driving connection between a power input shaft and said power output shaft and disengageable to disestablish said driving connection, of manually operable control means for effecting normal engagement and disengagement of said clutch with said power output shaft free to turn, speed responsive protective means operable when rotation of said power output shaft is caused to drop below a certain speed to effect disengagement of said clutch, drive means connecting said speed responsive means to said output shaft for operation thereby, other means operable to render said protective means inoperable for a certain time period subsequent to engagement of said clutch to allow said power output shaft to attain a speed above said certain speed when normally free to turn, and means operable to render said manually operable control means again effective when rendered ineffective by operation of said protective means.

6. The combination with a clutch engageable to establish a driving connection between a power input shaft and a power output shaft and disengageable to disestablish said driving connection, of means for effecting engagement of said clutch, first signal means for indicating normal operation of said output shaft, second signal means for indicating a stalled condition of said output shaft, and means responsive to stalling of said output shaft for effecting disengagement of said clutch, operation of said second signal means and termination of operation of said first signal means.

7. The combination with a source of fluid under pressure, a source of electrical energy, and fluid pressure clutch means operable to establish a driving connection between a power input shaft and a power output shaft upon supply of fluid under pressure to a clutch chamber and operable to disestablish said driving connection upon release of fluid under pressure from said clutch chamber, a first relay valve device operable upon supply of fluid under pressure to a first control chamber to establish a first communication between a supply conduit and said clutch chamber and upon release of fluid under pressure from said control chamber to disestablish said first communication and vent said clutch chamber to atmosphere, an operator's control device operable manually to effect supply and release of fluid under pressure to and from said control chamber, a second relay valve device operable upon supply of fluid under pressure to a second control chamber to establish a second communication between said supply conduit and said source of fluid under pressure and upon release of fluid under pressure from said second control chamber to disestablish said second communication and vent said supply conduit to atmosphere, a double check valve device having one inlet opening, another inlet opening and an outlet opening connected to said second control chamber, a reset valve device normally venting said one inlet opening to atmosphere and operable manually to effect supply of fluid under pressure to said one inlet opening, a magnet valve device normally establishing a third communication between said other inlet opening and said supply conduit and operable upon energization to disestablish said third communication and to vent said other inlet opening to atmosphere, a speed switch device responsive to speed of rotation of said output shaft for effecting supply of electrical energy from said source of electrical energy to energize said magnet valve device upon reduction in speed of said output shaft below a certain value.

8. The combination with a source of fluid under pressure, a source of electrical energy, and fluid pressure clutch means operable to establish a driving connection between a power input shaft and a power output shaft upon supply of fluid under pressure to a clutch chamber and operable to disestablish said driving connection upon release of fluid under pressure from said clutch chamber, a first relay valve device operable upon supply of fluid under pressure to a first control chamber to establish a first communication between a supply conduit and said clutch chamber and upon release of fluid under pressure from said control chamber to disestablish said first communication and vent said clutch chamber to atmosphere, an operator's control device operable manually to effect supply and release of fluid under pressure to and from said control chamber, a second relay valve device operable upon supply of fluid under pressure to a second control chamber to establish a second communication between said supply conduit and said source of fluid under pressure and upon release of fluid under pressure from said second control chamber to disestablish said second communication and vent said supply conduit to atmosphere, a double check valve device having one inlet opening, another inlet opening and an outlet opening connected to said second control chamber, a reset valve device normally venting said one inlet opening to atmosphere and operable manually to effect supply of fluid under pressure to said one inlet opening, a magnet valve device normally establishing a third communication between said other inlet opening and said supply conduit and operable upon energization to disestablish said third communication and to vent said other inlet opening to atmosphere, a speed switch device responsive to speed of rotation of said output shaft for effecting supply of electrical energy from said source of electrical energy to energize said magnet valve device upon reduction in speed of said output shaft below a certain value, and fluid pressure switch means having a pressure chamber with a connection to said clutch chamber and operable upon release of fluid under pressure from its pressure chamber to render said speed switch device ineffective to cause energization of said magnet valve device.

9. The combination with a source of fluid under pressure, a source of electrical energy, and fluid pressure clutch means operable to establish a driving connection between a power input shaft and a power output shaft upon supply of fluid under pressure to a clutch chamber and operable to disestablish said driving connection upon release of fluid under pressure from said clutch chamber, a first relay valve device operable upon supply of fluid under pressure to a first control chamber to establish a first communication between a supply conduit and said clutch chamber and upon release of fluid under pressure from said control chamber to disestablish said first communication and vent said clutch chamber to atmosphere, an operator's control device operable manually to effect supply and release of fluid under pressure to and from said control chamber, a second relay valve device operable upon supply of fluid under pressure to a second control chamber to establish a second communication between said supply conduit and said source of fluid under pressure and upon release of fluid under pressure from said second control chamber to disestablish said second communication and vent said supply conduit to atmosphere, a double check valve device having one inlet opening, another inlet opening and an outlet opening connected to said second control chamber, a reset valve device normally venting said one inlet opening to atmosphere and operable manually to effect supply of fluid under pressure to said one inlet opening, a magnet valve device normally establishing a third communication between said other inlet opening and said supply conduit and operable upon energization to disestablish said third communication and to vent said other inlet opening to atmosphere, a speed switch device responsive to speed of rotation of said output shaft for effecting supply of electrical energy from said source of electrical energy to energize said magnet valve device upon reduction in speed of said output shaft below a certain value, and fluid pressure switch means having a pressure chamber with a connection to said clutch chamber and operable upon release of fluid under pressure from its pressure chamber to render said speed switch device ineffective to cause energization of said magnet valve device, and choke and check valve means inserted in said connection arranged to restrict flow of fluid under pressure to said pressure chamber and allow for a more rapid rate of release of such fluid under pressure therefrom.

10. The combination with a source of fluid under pressure, a source of electrical energy, and fluid pressure clutch means operable to establish a driving connection between a power input shaft and a power output shaft upon supply of fluid under pressure to a clutch chamber and operable to disestablish said driving connection upon release of fluid under pressure from said clutch chamber, a first relay valve device operable upon supply of fluid under pressure to a first control chamber to establish a first communication between a supply conduit and said clutch chamber and upon release of fluid under pressure from said control chamber to disestablish said first communication and vent said clutch chamber to atmosphere, a choke in said supply conduit, an operator's control device operable manually to effect supply and release of fluid under pressure to and from said control chamber, a second relay valve device operable upon supply of fluid under pressure to a second control chamber to establish a second communication between said supply conduit and said source of fluid under pressure and upon release of fluid under pressure from said second control chamber to disestablish said second communication and vent said supply conduit to atmosphere, a double check valve device having one inlet opening, another inlet opening and an outlet opening connected to said second control chamber, a reset valve device normally venting said one inlet opening to atmosphere and operable manually to effect supply of fluid under pressure to said one inlet opening, a magnet valve device normally establishing a third communication between said other inlet opening and said supply conduit and operable upon energization to disestablish said third communication and to vent said other inlet opening to atmosphere, a speed switch device responsive to speed of rotation of said output shaft for effecting supply of electrical energy from said source of electrical energy to energize said magnet valve device upon reduction in speed of said output shaft below a certain value, and fluid pressure switch means having a pressure chamber with a connection to said clutch chamber and operable upon release of fluid under pressure from its pressure chamber to render said speed switch device ineffective to cause energization of said magnet valve device, signal means operable electrically to indicate existence of a stalled shaft condition, a second pressure switch responsive to release of fluid under pressure from said supply conduit for effecting operation of said signal means, and electric switch means operable manually to one position to render said signal means operable with energization of said magnet valve device and to another position to render said signal means controllable by said second pressure switch.

11. The combination with drive and driven shafts, of a clutch engageable for driving said driven shaft from said drive shaft, an operator's control device movable to one position to effect engagement of said clutch and movable to another position to effect disengagement of said clutch, speed means responsive to rotation of said output shaft, interlock means movable to first and second positions in response to movement of said operator's control device to said one and other positions, respectively, and comprising means arranged in said first position to cooperate with said speed means for effecting disengagement of said clutch below a chosen speed of said output shaft, and in said second position to render said speed means ineffective to control said clutch, and means for delaying movement of said interlock means to said first position in response to movement of said operator's control device to said one position and providing for prompt movement of said interlock means to said second position in response to movement of said operator's control device to said other position.

12. The combination with power input and output shafts of a clutch for coupling said shafts, an operator's control device, first relay means responsive to movement of said operator's control device to one position to effect engagement of said clutch and responsive to movement of said operator's control device to another position to effect disengagement of said clutch, second relay means for interrupting the clutch engaging circuit through said first relay means and for effecting disengagement of said clutch, other means for effecting operation of said second relay means, speed means responsive to reduction in speed of said output shaft to a chosen degree with said clutch engaged to effect operation of said other means, and reset means for effecting operation of said second relay means to restore said clutch engaging circuit.

13. Apparatus for protecting a friction clutch against excessive damage due to continuous slippage in event of locking of its otherwise rotatable output friction element while its rotatable input element persists to turn, comprising in combination with said output friction element, speed responsive means driven by said output friction element, said speed responsive means establishing one operational condition upon termination of rotation of said output friction element, actuating means operatively connected to said clutch for effecting engagement and disengagement between the input and output friction elements, means responsive to said one operational condition to effect operation of said actuating means to effect said disengagement and responsive to another operational condition to effect operation of said actuating means to effect said engagement, manually controlled means operable to establish said other operational condition, interlock means responsive to establishment of said one and other operational condition to render said speed responsive means ineffective and effective, respectively, to establish said one operational condition, and timing means to delay response of said interlock means to establishment of said other operational condition.

14. In combination, a friction clutch rotatable driving element, a friction clutch driven element, clutch motor means responsive to supply of fluid under pressure to a chamber to effect engagement between said driving element and said driven element and responsive to release of such fluid under pressure to effect disengagement between said driving element and said driven element, a source of fluid under pressure, a supply pipe, first manually controlled means operable to connect said chamber selectively to said supply pipe and to atmosphere, relay valve means operable to one position and to an other position to connect said supply pipe selectively to said source and to atmosphere, respectively, second manually controlled means operable to effect establishment of said one position, and speed responsive means operably connected to said driven element and having an operative connection with said relay valve means to effect establishment of said other position upon termination of rotation of said driven element.

15. In combination, a friction clutch rotatable driving element, a friction clutch driven element, clutch motor means responsive to supply of fluid under pressure to a chamber to effect engagement between said driving element and said driven element and responsive to release of such fluid under pressure to effect disengagement between said driving element and said driven element, a source of fluid under pressure, a supply pipe, first manually controlled means operable to connect said chamber selectively to said supply pipe and to atmosphere, relay valve means operable to one position and an other position to connect said supply pipe selectively to said source and to atmosphere, respectively, second manually controlled means operable to effect establishment of said one position, speed responsive means operably connected to said driven element and having an operative connection with said relay valve means to effect establishment of said other position upon termination of rotation of said driven element, interlock means responsive to supply and release of fluid under pressure to and from said chamber to establish and disestablish said operative connection, respectively, and timing means to delay response of said interlock means to supply of fluid under pressure to said chamber.

16. In combination, a drive shaft, a driven shaft, clutch means for driving said driven shaft by said drive shaft, interlock means having a first position and a second position, operator's control means for rendering said clutch means selectively effective or ineffective to drive said driven shaft and for at the same time effecting movement of said interlock means to its first and second positions, respectively, other means having one position for rendering said clutch means ineffective and terminating control of said clutch means by said operator's control means, speed responsive means, means connecting said speed responsive means to said driven shaft for sensing speed of rotation thereof, and means operative by said speed responsive means at and below a chosen speed of said driven shaft to cooperate with said interlock means in its first position for effecting operation of said other means to its said one position, and means operable with said interlock means in its second position to effect operation of said other means to a second position for restoring control of said clutch means to said operator's control means.

RALPH C. BROOKS.

References Cited in the file of this patent

UNITED STATES PATENTS

| Number | Name | Date |
| --- | --- | --- |
| 2,058,550 | Baits | Oct. 27, 1936 |
| 2,144,074 | Maybach | Jan. 17, 1939 |
| 2,152,089 | Price et al. | Mar. 28, 1939 |
| 2,175,219 | Sanford | Oct. 10, 1939 |
| 2,226,801 | Black | Dec. 31, 1940 |
| 2,277,554 | McCoy | Mar. 24, 1942 |
| 2,286,585 | Simpson | June 16, 1942 |
| 2,355,710 | Dodge | Aug. 15, 1944 |
| 2,375,440 | Roche | May 8, 1945 |
| 2,408,638 | Hedgerock | Oct. 1, 1946 |
| 2,432,272 | Bariffi | Dec. 9, 1947 |